(12) United States Patent
Zhou et al.

(10) Patent No.: US 9,223,023 B2
(45) Date of Patent: Dec. 29, 2015

(54) PROXIMITY SENSING SYSTEMS AND METHODS

(71) Applicant: SZ DJI TECHNOLOGY Co., Ltd, Shenzhen (CN)

(72) Inventors: Wancheng Zhou, Shenzhen (CN); Liming Huang, Shenzhen (CN)

(73) Assignee: SZ DJI TECHNOLOGY Co., Ltd, Shenzhen (CN)

( * ) Notice: Subject to any disclaimer, the term of this patent is extended or adjusted under 35 U.S.C. 154(b) by 0 days.

(21) Appl. No.: 14/463,578

(22) Filed: Aug. 19, 2014

(65) Prior Publication Data
US 2015/0292879 A1 Oct. 15, 2015

Related U.S. Application Data

(63) Continuation of application No. PCT/CN2014/075192, filed on Apr. 11, 2014.

(51) Int. Cl.
*G01S 15/93* (2006.01)
*G01B 17/00* (2006.01)
(Continued)

(52) U.S. Cl.
CPC ............... *G01S 15/931* (2013.01); *G01B 17/00* (2013.01); *G01S 7/529* (2013.01); *G01S 7/5273* (2013.01); *G01S 15/93* (2013.01)

(58) Field of Classification Search
CPC ....... G01S 15/18; G01S 15/93; G01S 15/931; G01S 7/527; G01S 7/5273; G01S 7/529
USPC .......................................................... 73/602
See application file for complete search history.

(56) References Cited

U.S. PATENT DOCUMENTS 3,283,292 A * 11/1966 Kay .................................. 367/95
4,325,255 A * 4/1982 Howard et al. ................. 73/589
4,972,385 A * 11/1990 Teel ................................ 367/99
(Continued)

FOREIGN PATENT DOCUMENTS

CN 102288782 A 12/2011
CN 103235311 A 8/2013
(Continued)

OTHER PUBLICATIONS

International search report and written opinion dated Jan. 4, 2015 for PCT/CN2014/079012.

*Primary Examiner* — Laura Martin
*Assistant Examiner* — Rose M Miller
(74) *Attorney, Agent, or Firm* — Wilson Sonsini Goodrich & Rosati

(57) ABSTRACT

Methods, systems and device are provided for improving the range and accuracy of proximity measurement such as in ultrasonic sensing systems. In particular, the blind zone caused by reverberation signals can be reduced or eliminated by attenuating signals received during the time period corresponding to the blind zone without. In an implementation, an attenuator circuit is selected by a switch to process received signals during the blind zone time period and deselected by the switch after the time zone time period. Additionally, the accuracy and range of the measurement can be improved by varying the gain provided to the received signals based on the varying measuring distance. In an implementation, a gain-adjustable amplifier is controlled by a gain control signal to provide incremental gain as time increases.

25 Claims, 7 Drawing Sheets

(51) Int. Cl.
  *G01S 7/529* (2006.01)
  *G01S 7/527* (2006.01)

(56) References Cited

U.S. PATENT DOCUMENTS

| | | | |
|---|---|---|---|
| 4,999,817 A | 3/1991 | Zimmer | |
| 5,231,608 A | 7/1993 | Matsui | |
| 5,760,309 A * | 6/1998 | Maltby et al. | 73/646 |
| 5,917,776 A | 6/1999 | Foreman | |
| 2008/0202243 A1* | 8/2008 | Gross | 73/627 |
| 2010/0074056 A1* | 3/2010 | Harada et al. | 367/93 |
| 2012/0068574 A1 | 3/2012 | Wu et al. | |

FOREIGN PATENT DOCUMENTS

| | | | |
|---|---|---|---|
| JP | 04116488 A | * | 4/1992 |
| JP | H 04116488 A | | 4/1992 |

\* cited by examiner

PROXIMITY SENSING SYSTEMS AND METHODS

CROSS-REFERENCE

This application is a continuation application of International Application No. PCT/CN2014/075192, filed on Apr. 11, 2014, the content of which is hereby incorporated by reference in its entirety.

BACKGROUND OF THE INVENTION

Proximity sensors such as ultrasonic sensors have been widely used to detect distance to objects. In particular, ultrasonic sensors are typically configured to generate ultrasonic signals with an ultrasonic transducer and to receive the echo signals reflected back by the objects. By calculating the time interval between sending the ultrasonic signal and receiving the echo signal, the distance to an object can be determined based on the propagation speed of sound through the propagation medium such as air.

Traditionally, the application of the ultrasonic sensors is limited by the existence of the blind zone, which is caused by residual mechanical vibration of the ultrasonic transducer. Ultrasonic transducers are typically configured to generate ultrasonic signals by high frequency vibrations or resonance caused by an excitation signal. For example, a pulse of electrical energy can cause a piezoelectric transducer to vibrate at a given frequency due to piezoelectricity, thereby generating an ultrasonic sound wave. The echo of the transmitted ultrasonic signal as reflected by an object can then be detected and evaluated to determine a distance to the object. However, once the excitation signal (e.g., electrical signal) is removed, the vibration of the transducer usually does not stop immediately. Rather, due to elasticity, the transducer typically continues to vibrate for a period of time, albeit in a dampening fashion. Such residual vibration or reverberation can be detected by the ultrasonic sensor. Reverberation signals can obscure the detection of echo signals. The blind zone is the area surrounding the ultrasonic transducer in which echo signals cannot be reliably detected as distinguished from reverberation signals.

Existing methods attempt to solve the problem of blind zone using either a software approach or a mechanical approach. Under the software approach, the detection of ultrasonic signals is disabled during the time period corresponding to the blind zone so as to avoid detecting the reverberation signals as echo signals. However, the software approach merely avoids but does not reduce or remove the blind zone. That is, objects located within the blind zone still cannot be reliably detected. Using a mechanical approach, the receiver probe of the ultrasonic sensor can be padded or otherwise protected using physical barriers. While this approach can reduce or remove the blind zone by reducing the amplitude of the reverberation signals reaching the receiver probe, the complexity and cost of manufacturing is likely to increase.

SUMMARY OF THE INVENTION

The present invention provides methods and systems for reducing or even eliminating the blind zone, thereby decreasing the minimum measuring distance, without increasing the production cost. Unlike the software approach mentioned above, the present invention makes it possible to detect objects located within the blind zone, effectively reduced or eliminating the blind zone. Additionally, the present invention is implemented at the circuit level, thereby avoiding the added cost of production associated with the mechanical approach mentioned above.

According to an aspect of the present invention, an ultrasonic sensing system is provided. The ultrasonic sensing system comprises an ultrasonic transmitter configured to provide a transmission of ultrasonic signals; an ultrasonic receiver configured to receive ultrasonic signals generated as a result of the transmission including reverberation signals and echo signals; an attenuator circuit connectable to the ultrasonic receiver via a switch, the attenuator circuit operable for attenuating the received ultrasonic signals; and a microcontroller unit (MCU) configured to control the switch to electrically couple the ultrasonic receiver with the attenuator circuit only during a predetermined period of time after the transmission of ultrasonic signals.

In some embodiments, the ultrasonic transmitter is the ultrasonic receiver. The predetermined period of time can corresponds to a time period during which the reverberation signals are detectable. The predetermined period of time can correspond to a blind zone time period.

In some embodiments, the attenuator circuit is selected based at least in part on a previously-measured amplitude of a reverberation signal or an echo signal.

In some embodiments, the switch includes a single-pole double-throw (SPDT) switch.

In some embodiments, the ultrasonic sensing system described herein further comprises a booster configured to increase an energy level associated with the transmission of the ultrasonic signal. The booster can be configured to improve the power level of an electric signal that is usable for causing the transmission of ultrasonic signals.

In some embodiments, the ultrasonic sensing system described herein further comprises a gain-adjustable amplifier configured to amplify the echo signals.

In some embodiments, the MCU is further configured to control the gain-adjustable amplifier to vary its gain based at least in part on a value of a timer that corresponds to a measuring distance from the ultrasonic sensing system. The MCU may control the gain-adjustable amplifier based on previously-measured data.

In some embodiments, the MCU is further configured to control the switch to electrically couple the ultrasonic receiver with the gain-adjustable amplifier without electrically coupling the attenuator circuit with the gain-adjustable amplifier after the predetermined period of time has elapsed.

In some embodiments, the ultrasonic sensing system described herein further comprises a comparator connected to the gain-adjustable amplifier that is configured to compare an output of the gain-adjustable amplifier with a predetermined threshold value. The MCU is further configured to control a gain of the gain-adjustable amplifier based at least in part on an output of the comparator. The comparator may or may not be integrated with the MCU.

In some embodiments, the ultrasonic sensing system described herein further comprises an analog-to-digital converter (ADC) connected to the gain-adjustable amplifier that is configured to convert the output of the gain-adjustable amplifier to a digital value. The gain-adjustable amplifier can be controlled based at least in part on an output of the ADC. The ADC may or may not be integrated with the MCU. In some embodiments, the comparator and the ADC are used in conjunction to determine an occurrence of a peak amplitude.

According to another aspect of the present invention, a method for ultrasonic sensing is provided. The method can comprise detecting a signal after termination of a transmission of ultrasonic signals, the detected signal can be an echo signal or a reverberation signal; determining whether the detection of the ultrasonic signal occurs within a predetermined period of time from the terminal of the transmission of ultrasonic signals; in response to a determination that the detection of the signal occurs within the predetermined period of time, attenuating the detected signal to sufficiently reduce interference caused by reverberation from the transmission of the ultrasonic signals; and in response to a determination that the detection of the signal occurs after the predetermined period of time has elapsed, processing, without attenuating, the detected signal to determine proximity of an object.

In some embodiments, the predetermined period of time corresponds to a time period during which the reverberation is detectable. In some embodiments, the predetermined period of time corresponds to a blind zone time period.

In some embodiments, the ultrasonic signals transmitted by the transmission are amplified prior to the transmission of the ultrasonic signals, for example, using a booster.

In some embodiments, attenuating the detected ultrasonic signal is based at least in part on amplitude of one or more previously-measured signal. The previously-measured signals can include a reverberation signal, an echo signal, or both.

In some embodiments, processing the detected ultrasonic signal includes determining occurrence of a peak amplitude using a comparator and an analog-to-digital converter (ADC). Zero, one, or both of the comparator and the ADC can be included in a multi-controller unit (MCU).

The method described herein can further comprise providing a gain to the detected ultrasonic signal based at least in part on previously-measured data. The previously-measured data can correlate a measuring distance and a gain suitable for the measuring distance.

The method described herein can further comprise providing a gain to the detected ultrasonic signal based at least in part on a timer value.

According to another aspect of the present invention, an ultrasonic sensing system is provided. The system can comprise an ultrasonic transmitter configured to provide a transmission of ultrasonic signals; an ultrasonic receiver configured to receive ultrasonic signals generated as a result of the transmission including reverberation signals and echo signals; and an attenuator circuit connectable to the ultrasonic receiver, the attenuator circuit operable for eliminating substantially all of the reverberation signals without eliminating the echo signals. In some embodiments, the ultrasonic transmitter is the ultrasonic receiver.

The attenuator circuit can be connected to the ultrasonic receiver only during a predetermined period of time. The predetermined period of time corresponds to a blind zone time period. The attenuator circuit can be selected based at least in part on a previously-measured amplitude of a signal such a reverberation signal or an echo signal.

In some embodiments, the ultrasonic sensing system described herein further comprises a booster configured to increase an energy level associated with the transmission of the ultrasonic signal. The booster can be configured to increase a voltage level of an electric signal that is usable for causing the transmission of ultrasonic signals.

In some embodiments, the ultrasonic sensing system described herein further comprises a microcontroller unit (MCU) configured to control a switch to electrically couple the ultrasonic receiver with the attenuator circuit only during a predetermined period of time after the transmission of ultrasound signals. The switch can include a single-pole double-throw (SPDT) switch.

In some embodiments, the ultrasonic sensing system described herein further comprises a gain-adjustable amplifier connectable to the ultrasonic receiver via the switch and connected to the attenuator circuit in series, the gain-adjustable amplifier configured to amplify the echo signals.

In some embodiments, the MCU is further configured to control the gain-adjustable amplifier to vary its gain based at least in part on a value of a timer that corresponds to a measuring distance from the ultrasonic sensing system. The MCU may control the gain-adjustable amplifier based on previously-measured data.

In some embodiments, the MCU is further configured to control the switch to electrically couple the ultrasonic receiver with the gain-adjustable amplifier without electrically coupling the attenuator circuit with the gain-adjustable amplifier after the predetermined period of time has elapsed.

In some embodiments, the ultrasonic sensing system described herein further comprises a comparator connected to the gain-adjustable amplifier that is configured to compare an output of the gain-adjustable amplifier with a predetermined threshold value. The MCU can be further configured to control a gain of the gain-adjustable amplifier based at least in part on an output of the comparator. The comparator may or may not be integrated with the MCU.

In some embodiments, the ultrasonic sensing system described herein further comprises an analog-to-digital converter (ADC) connected to the gain-adjustable amplifier that is configured to convert the output of the gain-adjustable amplifier to a digital value. The gain-adjustable amplifier can be controlled based at least in part on an output of the ADC. The ADC may or may not be integrated with the MCU. In some embodiments, the comparator and the ADC are used in conjunction to determine an occurrence of a peak amplitude.

According to another aspect of the present invention, a method for ultrasonic sensing is provided. The method comprises detecting an ultrasonic signal after termination of a transmission of ultrasonic signals, wherein the detected ultrasonic signal is an echo signal or a reverberation signal; and attenuating the detected ultrasonic signal, thereby substantially eliminating the reverberation signal without eliminating the echo signal. In some embodiments, the attenuation of the detected ultrasonic signal is applied only within a predetermined period of time from the transmission of the ultrasonic signals. The predetermined period of time can correspond to a blind zone time period.

In some embodiments, the ultrasonic signals transmitted by the transmission are amplified prior to the transmission of the ultrasonic signals, for example, by a booster.

In some embodiments, attenuating the detected ultrasonic signal is based at least in part on a previously-measured amplitude of a reverberation signal or an echo signal.

In some embodiments, the method described herein further comprises determining occurrence of a peak amplitude using a comparator and an analog-to-digital converter (ADC). Zero, one or both of the comparator and the ADC can be included in a multi-controller unit (MCU).

In some embodiments, the method described herein further comprises providing a gain to the detected ultrasonic signal based at least in part on previously-measured data. The previously-measured data can correlate a measuring distance and a gain suitable for the measuring distance.

In some embodiments, the method described herein further comprises providing a gain to the detected ultrasonic signal based at least in part on a timer value.

According to another aspect of the present invention, a method for ultrasonic sensing is provided. The method comprises adjusting an amplifier to provide a first gain to received ultrasonic signals based at least in part on previously-measured adjustable gain control (AGC) data; and adjusting the amplifier, at a later point in time, to provide a second gain that is greater than the first gain based at least in part on the previously-measured AGC data. The previously-measured AGC data can correlate a measuring distance and a gain suitable for the measuring distance. For instance, the gain can increase, at least in part, as the measuring distance increases.

In some embodiments, the method described herein further comprises adjusting the amplifier to provide increasing gains, over time, until an echo signal is detected or until a predetermined measurement time is reached.

In some embodiments, the received ultrasonic signals are attenuated, prior to being amplified, only if the ultrasonic signals are received during a predetermined period of time. During the predetermined period of time, the received ultrasonic signals can be attenuated so as to eliminate substantially all of reverberation signals without eliminating echo signals.

In some embodiments, the received ultrasonic signals are attenuated based at least in part on a previously-measured amplitude of a reverberation signal or an echo signal. The predetermined period of time can include a blind zone time period.

In some embodiments, the method described herein further comprises determining occurrence of a peak amplitude using a comparator and an analog-to-digital converter (ADC). Zero, one or both of the comparator and the ADC can be included in a multi-controller unit (MCU).

It shall be understood that different aspects of the invention can be appreciated individually, collectively, or in combination with each other. Various aspects of the invention described herein may be applied to any of the particular applications set forth below. Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
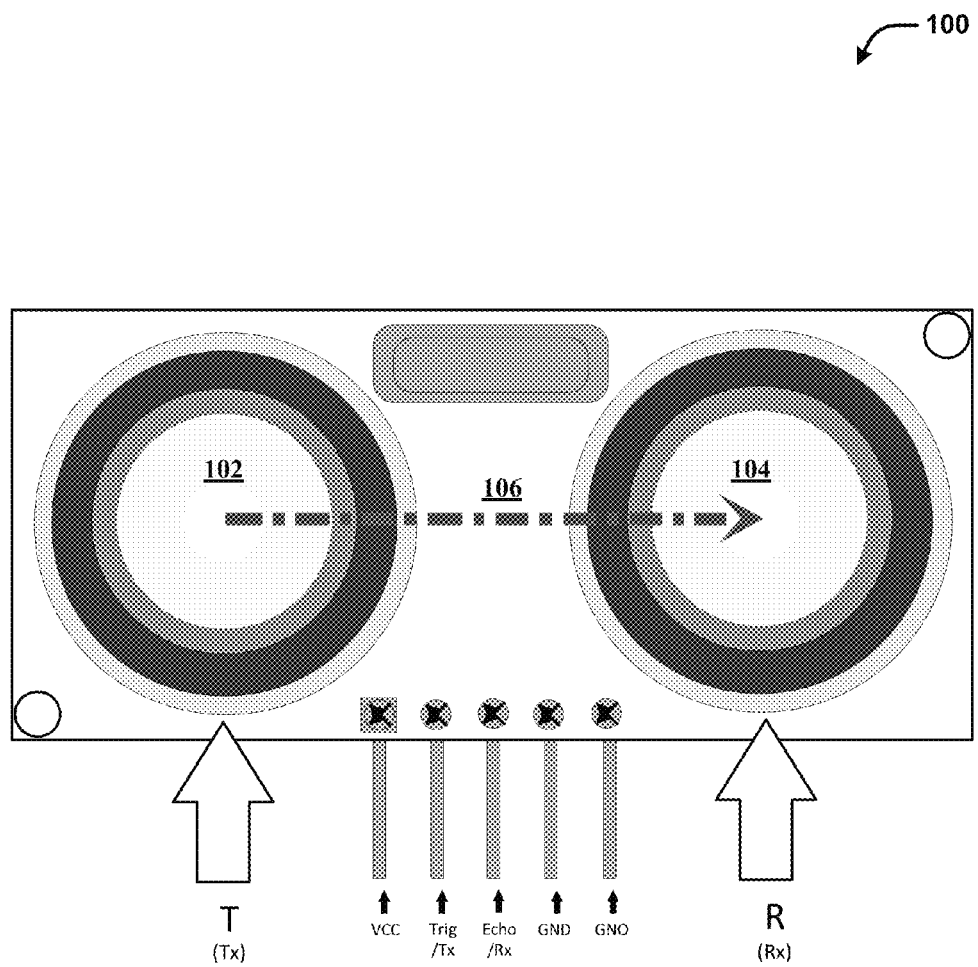
FIG. 1 illustrates an exemplary ultrasonic sensor, in accordance with an embodiment.

Methods, systems and device are provided for reducing or eliminating a blind zone associated with ultrasonic sensors, thereby decreasing the minimum measuring distance, without reducing the maximum measuring distance and without increasing production cost. According to an aspect of the present invention, methods and systems for reducing or eliminating blind zone associated with ultrasonic sensing are provided. In some embodiments, an attenuator circuit is introduced to attenuate the received signals during the time period corresponding to the blind zone in order to remove substantially all reverberation signals while preserving substantially all echo signals as reflected from objects. The selection and de-selection of the attenuator circuit may be achieved by a controllable switch. The amount of attenuation provided by the attenuator circuit may be configurable based on values (e.g., amplitude) of actually measured reverberation signals and echo signals, among other factors.

According to another aspect of the present invention, methods and systems are provided for dynamically adjusting gains of echo signals to improve the accuracy of proximity measurement. Specifically, a gain-adjustable amplifier may be provided to amplify received signals based on a current measuring distance as indicated by the time that has elapsed since the start of the measurement. The amount of gain of the gain-adjustable amplifier may be controlled by a controller based on the measuring distance. The longer the measurement distance, the more attenuated the echo signals tend to be, and hence the more gain is provided by the gain-adjustable amplifier to amplify the echo signals. In some embodiments, amount of gain is adjusted periodically by the controller based on empirical measurement data.

According to another aspect of the present invention, methods and systems are provided for using the analog-to-digital converter (ADC) in conjunction with a comparator to improve the precision and accuracy of proximity measurement. In particular, the comparator can be used to trigger proximity measurement and the ADC can be used to determine, within a predetermined period of time, a point in time when the relative peak amplitude is received. This point in time can then be used in the calculation of the distance to the object from which the echo signal is reflected. By pinpointing the time of the peak amplitude, the precision and accuracy of the proximity measurement is improved.

According to an aspect of the present invention, methods and systems are provided for increasing the power associated with the ultrasonic transmission. Boosting of the transmission power is preferable, for example, to overcome the attenuation of the sound signals in the surrounding environment and/or to increase the upper limit of the measurement range. To increase the transmission power, the transmission circuit of the ultrasonic system can include a booster that is configured to increase the electrical power used for the transmission. In an embodiment, the booster can be implemented by a transformer (e.g., a step-up transformer) configured to increase the voltage level of the electrical signal provided by the controller.

It shall be understood that different aspects of the invention can be appreciated individually, collectively, or in combination with each other. Various aspects of the invention described herein may be applied to any of the particular applications set forth below. Other objects and features of the present invention will become apparent by a review of the specification, claims, and appended figures.

FIG. 1 illustrates an exemplary ultrasonic sensor 100, in accordance with an embodiment. The ultrasonic sensor 100 includes a transmitter 102 and a receiver 104. The ultrasonic transmitter is configured to convert electrical signals to sound signals whereas the ultrasonic receiver is configured to convert sound signals to electrical signals. In some cases, the ultrasonic receiver and the ultrasonic transmitter are implemented as separate devices. In other cases, the ultrasonic receiver and the ultrasonic transmitter are implemented by the same device capable of both transmitting and receiving ultrasonic signals. As used herein, the term ultrasonic transducer can refer to an ultrasonic transmitter, ultrasonic receiver, or both. The arrow from the ultrasonic transmitter 102 to the ultrasonic receiver 104 illustrates a reverberation 106 that can reach the ultrasonic receiver, e.g., after the transmitter 102 stops actively transmitting ultrasonic signals.

In some embodiments, the ultrasonic transducer (e.g., ultrasonic transmitter, ultrasonic receiver or both) can be constructed using piezoelectric principles. For example, the ultrasonic transducer can include a piezoelectric transducer made of natural or synthetic materials that exhibit piezoelectricity such as certain crystals (e.g., quartz, berlinite, sucrose, rochelle salt, topaz, or tourmaline-group minerals), bones, biological materials (e.g., tendon, silk, wood, enamel, dentin, or DNA), synthetic crystals (e.g., gallium orthophosphate or langasite), synthetic ceramics (e.g., lead zirconate titanate, barium titanate, lead titanate, potassium niobate, lithium niobate, lithium tantalate, sodium tungstate, or zinc oxide), polymers (e.g., polyvinylidene fluoride), organic nanostructures, and the like.

Alternatively, the ultrasonic transducer can be constructed using non-piezoelectric principles. For example, the ultrasonic transducer can comprise magnetostrictive materials that changes size when exposed to magnetic fields. As another example, the ultrasonic transducer can include a capacitor microphone that uses a thin plate which moves in response to ultrasound waves, causing changes in the electric fields around the plate to convert sound signals to electric currents.

FIG. 1 also illustrates some exemplary hardware pins provided by an exemplary ultrasonic proximity sensor board. In various embodiments, the definition of the hardware pins can be defined according to the specific requirement of actual applications. More, less and/or different hardware pins may be provided in various embodiments. In an illustrative embodiment, the hardware pins are defined as follows:

Vcc—power supply (the voltage is defined by actual demands);

Trig/Tx—external logic trigger to launch a measurement/ UART (Universal Asynchronous Receiver/Transmitter) terminal used to transmit measurement results or response to external commands;

Echo/Rx—measurement result shown as the pulse width/ UART receiving terminal used to receive commands;

GND—reference ground to power and signals.

Figure 2:
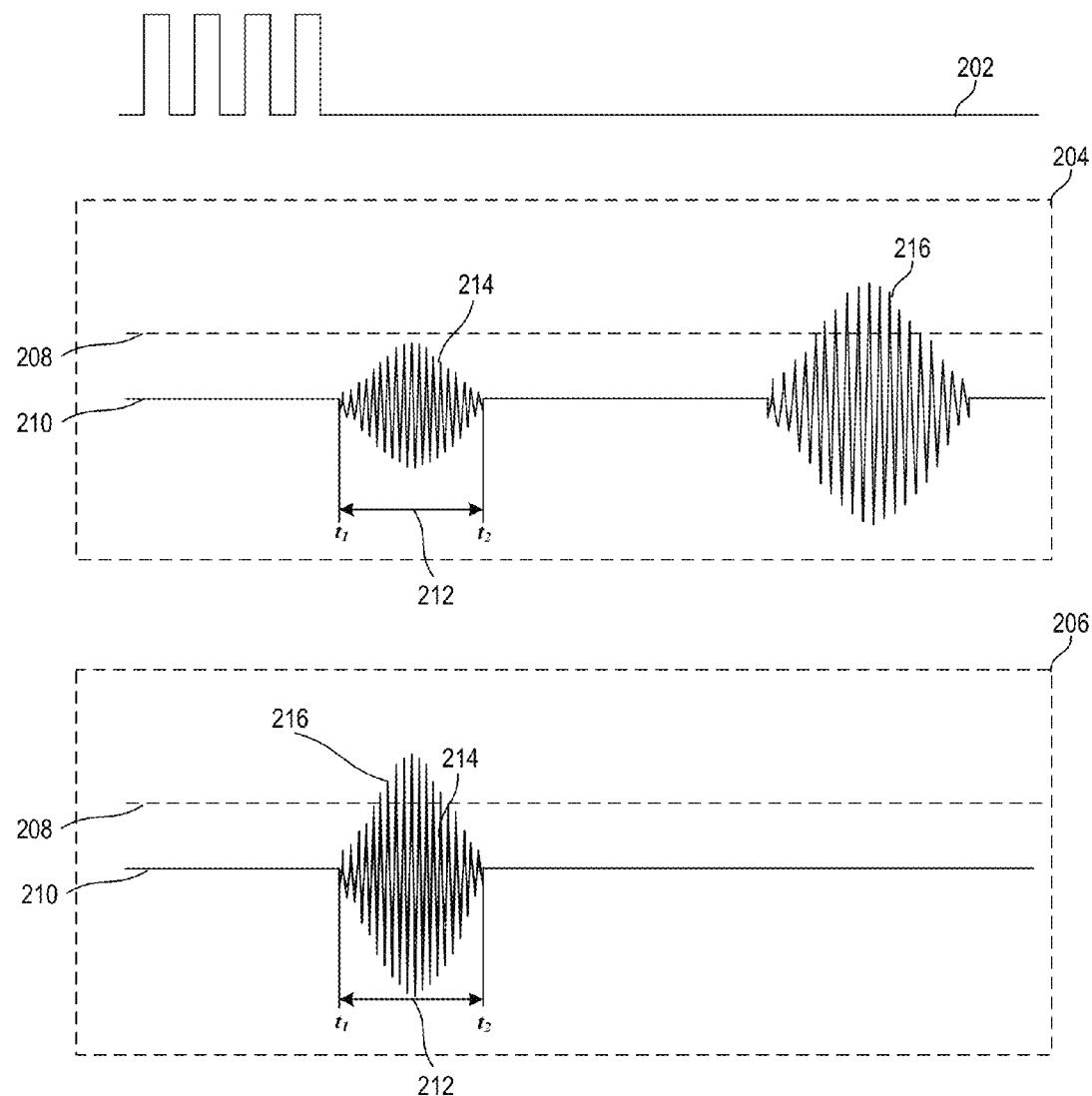
FIG. 2 illustrates exemplary signals detected by an ultrasonic receiver as a result of an ultrasonic transmission, in accordance with some embodiments.

FIG. 2 illustrates exemplary signals detected by an ultrasonic receiver as a result of an ultrasonic transmission, in accordance with some embodiments. As illustrated, an excitation electrical signal or driving pulse 202 causes an ultrasonic transmitter to vibrate and transmit ultrasonic signals. The driving pulse 202 is removed at around time $t_1$. However, the transmitter does not immediately stop vibrating even though the driving pulse 202 is removed (i.e., voltage level is zero). Instead, the transmitter continues to ring down or residually vibrate, causing residual vibration signal or reverberation signal 214 that can be received by the ultrasonic receiver. The signal level as received by the receiver probe is represented by 210. The reverberation can last for a period of time $t_b=t_2-t_1$ during which reverberation signals, if not suppressed (e.g., amplitude of the signal artificially attenuated), can obscure the receipt of true echo signals. The time period $t_b$ is thus referred to as the blind zone time period or dead zone time period, indicating a period of time when echo signals cannot be reliable detected as distinctly from the reverberation signals. During the blind zone time period, reverberation signals are not suppressed, may be strong enough (e.g., with sufficient amplitude) to trigger the threshold or triggering level 208 of a comparator. Such comparator triggering threshold is often used to determine whether true echo signals have been received.

Based on the velocity of sound c, a blind distance $d_b$ from the transducer can be calculated as $d_b=\frac{1}{2}*c*t_b$, within which an object cannot be reliably detected because the echo from the object can be obscured by reverberation signals. In other words, for an object in the blind zone, the time for the ultrasonic signal to reach the object and travel back to the transducer is less or equal than $t_b$. A blind zone refers to an area surrounding the transducer that is covered by the transmission (i.e., a blind zone) within which objects cannot be reliably detected because echoes from the objects tend to be obscured by the presence of reverberation. As used herein, the term blind zone time period is used to refer to $t_b$, during the ring down of the transducer prevents or obscures the detection of true echo signals. In various embodiments, the shape or size of the blind zone may be determined by the propagation medium, material and/or disposition of the transducer, characteristics of the excitation signal, and other factors. In general, reducing or eliminating blind zone is desirable for increasing the detectable range of proximity sensors, especially for close-range detection.

FIG. 2 illustrates the receiver signal in two exemplary situations. In the first scenario 204, an object is located beyond the blind zone of the transducer. Thus, the echo signal 216 occurs after the blind zone time period, after the occurrence of the reverberation signal 214. As illustrated, when the object is located beyond the blind zone, the echo signal from the object is not obscured by the reverberation signal.

In the second scenario 204, an object is located within the blind zone of the transducer. As a result, the echo signal 216 occurs during the same blind zone time period as the reverberation signal 214. In the illustrated scenario, it is clear that, if not suppressed, the reverberation signal 214 can obscure or prevent the detection of the true echo signal 216.

In both illustrated cases, the reverberation signal 214 is shown as being suppressed or otherwise attenuated (e.g., by a hardware attenuator circuit) to be lower than the triggering value 208 such that the reverberation signal does not falsely trigger the comparator. As explained in further detail, such attenuation of the received signals during the blind zone time can be used to effectively reduce or remove the impact of blind zone.

Using the attenuation techniques of the present invention, the true echo signal can also be attenuated if it occurs during the blind zone time period. However, the echo signals are typically stronger than the reverberation signals, especially within close range. Therefore it is possible to attenuate the reverberation signals so as to remove it (e.g., reducing the amplitude to be less than the triggering value of the comparator) while preserving the true echo signal (e.g., leaving the amplitude still greater than triggering value of the comparator). The reverberation is typically already weakened by the time it reaches the receiver probe. Other factors contributing to the reduced power of the reverberation signals can include the distance between the receiver and the transmitter, the launch angle of the transmitter and/or other factors. For example, the launch angle of the ultrasonic transmitter typically cannot reach 180 degrees. Exemplary launch angles can include but not limited to 30, 60, 90, 120, and 150 degrees. In contrast, the echo as reflected by objects located close to the receiver (i.e., in the blind zone) is typically not much weakened and typically enters directly into the receiver at a very small angle, preserving most power of the signal. Based on these factors, echo signals are typically stronger than the reverberation signals detected within the blind zone time period. Therefore, it is possible to remove substantially all the reverberation signals while preserving most of the echo signals within the blind zone time period by adjusting the amount of the attenuation. As shown in the scenario 206, even if attenuated by the attenuator circuit connected to the receiver, the reverberation signal 214 can be substantially or entirely removed (e.g., amplitude of the attenuated reverberation signal 214 is less than the triggering value 208) while substantially preserving the true echo signal 216 (e.g., amplitude of the attenuated echo signal is still greater than the triggering value 208).

Figure 3:
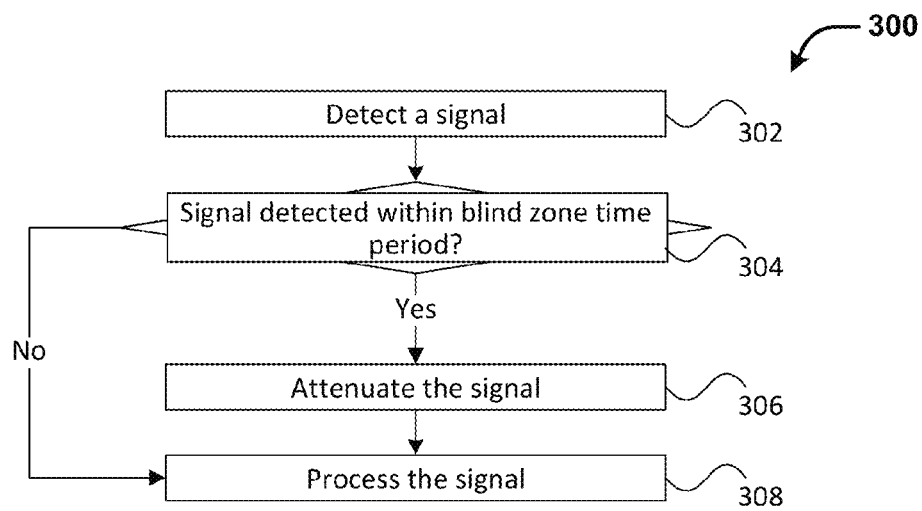
FIG. 3 illustrates an exemplary process for implementing blind zone reduction or removal, in accordance with an embodiment.
Figure 4:
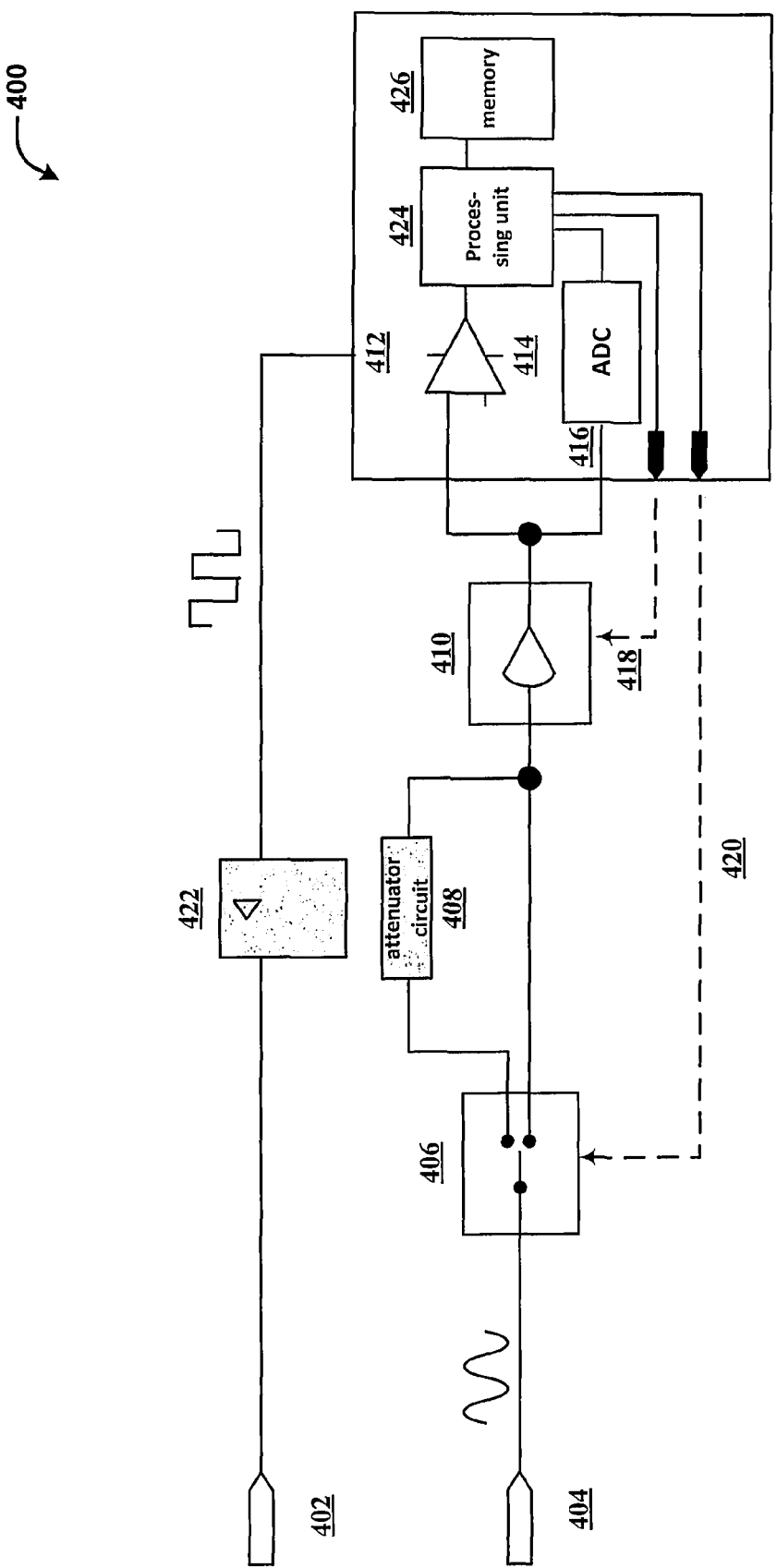
FIG. 4 illustrates an exemplary circuit diagram of an ultrasonic sensing system, according to an embodiment.

According to an aspect of the present invention, methods and systems for reducing or eliminating blind zone in proximity sensing systems are provided. FIG. 3 illustrates an exemplary process 300 for implementing blind zone reduction, in accordance with an embodiment. Some or all aspects of the process 300 (or any other processes described herein, or variations and/or combinations thereof) may be performed under the control of one or more computers, processors, or control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes. For example, aspects of the process 300 can be implemented by components of an ultrasonic sensor system such as illustrated in FIG. 4.

In an embodiment, the process 300 includes detecting 302 a signal after the termination of a transmission of ultrasonic signals. The transmission of the ultrasonic signals can occur in a manner described in FIGS. 1-2. For example, a pulse of electrical energy can be applied to a piezoelectric transmitter, causing it to vibrate or resonate, thereby generating sound waves. When the electrical energy is removed from the transmitter, the transmission is considered terminated. However, as discussed above, the vibration or resonance of the transmitter does not stop immediately. Rather, the transmitter will continue to vibrate, although at dampening amplitudes, for a period of time. Such reverberation can be detected by a receiver and converted to an electrical signal (i.e., a reverberation signal). If the transmitted ultrasonic signal is also reflected by an object, the echo may be detected by the receiver and converted to an electrical signal (i.e., an echo signal). From the perspective of the receiver, the detected electrical signal can be either an echo signal or a reverberation signal.

The process 300 further comprises determining 304 whether the detected signal is detected within a blind zone time period associated with an ultrasonic sensor, such as discussed in FIG. 2. For example, it can be determined whether the detection of the signal occurs within a predetermined period of time from the terminal of the transmission of ultrasonic signals. The predetermined period of time can be the time interval $t_b$ discussed above in FIG. 2 that corresponds to the blind zone time period. In an implementation, a timer associated with an ultrasonic sensor is started when the transmission of ultrasonic signals terminates or when the transmission starts. The current timer value can be compared with a predetermined blind zone time period (e.g., $t_b$) to determine whether the signal was detected with the blind zone time period.

If the signal is detected within the blind zone time period, the detected signal is attenuated 306 so as to reduce the power (e.g., amplitude) of the signal. The detected signal may be an echo signal or reverberation signal that is attenuated during the blind zone time period. However, within close range, echo (and the detected echo signal) tends to be stronger than reverberation (and the detected reverberation signal). This is because the reverberation is typically already weakened by the time it reaches the receiver probe. Other factors contributing to the reduced power of the reverberation signals can include the distance between the receiver and the transmitter, the launch angle of the transmitter and/or other factors. For example, the launch angle of the ultrasonic transmitter typically cannot reach 180 degrees. Exemplary launch angles can include but not limited to 30, 60, 90, 120, and 150 degrees. In contrast, the echo as reflected by objects located close to the receiver (i.e., in the blind zone) is typically not much weakened and typically enters directly into the receiver at a very small angle, preserving most power of the signal. Based on these factors, echo signals are typically stronger than the reverberation signals detected within the blind zone time period. Therefore, it is possible to remove substantially all the reverberation signals while preserving most of the echo signals within the blind zone time period by adjusting the amount of the attenuation.

In an embodiment, the amount of attenuation is selected based on the amplitude of actually measured reverberation signals and/or echo signals. For example, if the maximum amplitude (or other suitable value) based on actually measured reverberation signals is $V_r$ and the minimum threshold voltage to trigger proximity measurement is $V_0$, (hereinafter the triggering value), then the amount of attenuation may be set to $V_r-V_0$ or greater to ensure that the amplitude of any vibration residual signal is reduced to be at or below the triggering $V_0$. On the other hand, to ensure that the echo signals, even after attenuation, is still strong enough to trigger proximity measurement, the attenuation amount can be set to be less than $V_e-V_0$, where $V_e$ is minimum amplitude (or other suitable value) based on actually measured echo signals. Thus, the amount of attenuation, $\Delta V$ can be selected as follows:

$$V_r-V_0 < \Delta V < V_e-V_0$$

In an alternative embodiment, the amount of attenuation can be selected to be greater than the difference between the received reverberation signal $V_r$ and the triggering value $V_0$, but not less than the difference between the received echo signal and the triggering value. However, the amount of attenuation still needs to be less than the minimum echo signal to preserve the echo signals. In other words, $$\Delta V > V_r-V_0;$$

$$\Delta V \geq V_e-V_0; \text{ and}$$

$$\Delta V < V_e$$

In another alternative embodiment, the amount of attenuation $\Delta V$ can be set to be greater than a measured reverberation signal such that $V_r < \Delta V < V_e$. In various embodiments, Vr, Ve, and/or V0 values are determined based on test or calibration measurements. For example, any of the above values may be an average, mean, maximum, minimum, or any other derivation of the measured values.

In some embodiments, after the attenuation is applied, the reverberation signals are reduced to zero while the echo signals can be reduced to non-zero values below the triggering value. In such an embodiment, post-attenuation amplification may be necessary to bring the attenuated echo signals above the triggering value in order to trigger proximity measurement processing. Amplification can also be necessary to detect echo signals received outside the blind zone time period to compensate for the attenuation caused by the propagation medium. In general, the further away an object is from the ultrasonic receiver, the more attenuated the echo signal as reflected by the object is. To compensate for the greater attenuation of the echo signals, greater amplification or gain can be applied as the measurement range increases. Methods for providing dynamically adjusted gain control are discussed in further detail elsewhere in the disclosure.

Still referring to FIG. 3, if the detected signal is determined to be detected outside the blind zone time period (e.g., the timer value is greater than the blind zone time period), then attenuation of the detected signal is not needed (i.e., skipping block 306) because the residual signals are considered to have dampened below the minimum triggering value by then and the detected signal is presumably an echo signal. In some embodiments, the attenuation is switched on and off according to the value of a timer, which may be started at the start or end of the ultrasonic transmission. When the value of the timer is within the blind zone time period, the attenuation is switched on to attenuate the received signals. When the value of the timer has exceeds the blind zone time period, the attenuation is switched off so that the received signals are no longer attenuated. In an alternative embodiment, the attenuator may be configured to provide different degrees of attenuation during or beyond the blind zone time period. For example, greater attenuation may be provided during the blind zone time period than outside the blind zone time period.

Regardless of whether the signal is attenuated, the process 300 can include further processing 308 the signal. In some embodiments, processing 308 the signal can include amplifying the signal whether it is attenuated or not. As discussed above, such amplification may be necessary to increase the power of echo signals to a level that is sufficient to trigger the proximity measurement processing. In some embodiments, processing 308 the signal can include calculating the time between the sending of an ultrasonic signal and receiving the echo, thereby measuring the distance to an object. As described in further detail below, methods are provided for improving the precision and accuracy of the proximity measurement.

FIG. 4 illustrates an exemplary circuit diagram of an ultrasonic sensing system 400, according to an embodiment. In some embodiments, the ultrasonic sensing system 400 may include more or less components than those shown in FIG. 4. The ultrasonic sensing system 400 can be configured to implement aspects of the techniques discussed herein. For example, the ultrasonic sensing system can be configured to increase the measurement range of the ultrasonic sensing system by reducing or eliminating the blind zone, for example, by applying the time-based attenuation of received signals as discussed in FIG. 3. Additionally, the ultrasonic sensing system 400 can be configured to maintain or even increase the upper limit of the measurement range of the ultrasonic sensing system by increasing the energy of the ultrasonic transmission and/or by amplifying the received signals. Finally, the ultrasonic sensing system 400 can be configured to provide improved reliability and accuracy of proximity measurement by providing dynamic gain control of the received signals and by using an analog-to-digital converter (ADC) to determine the occurrence of peak amplitude.

The ultrasonic sensing system 400 comprises an ultrasonic transmitter 402 and an ultrasonic receiver 404. The ultrasonic transmitter 402 is connected to a transmitter circuit and the ultrasonic receiver 404 is connected to a receiver circuit. Either or both of the transmitter circuit and receiver circuit can be controlled at least in part by a controller 412. The ultrasonic transmitter 402 is configured to transmit ultrasonic signals in response to electrical signals and the ultrasonic receiver 404 is configured to convert received sound signals into electrical signals. For example, the ultrasonic transmitter 402 and/or an ultrasonic receiver 404 can be implemented by a piezoelectric transducer discussed in connection with FIG. 1. While the ultrasonic transmitter 402 and the ultrasonic receiver 404 are illustrated as separate devices, in some embodiments, they can be implemented by a single device such as one single piezoelectric transducer.

According to an aspect of the present invention, methods and systems are provided for increasing the power associated with the ultrasonic transmission. In some circumstances, boosting of the transmission power is preferable, for example, to overcome the attenuation of the sound signals in the surrounding environment and/or to increase the upper limit of the measurement range. For example, sound waves can be absorbed by wave-absorbing materials such as carpet, sponge, and the like. Therefore, when measuring proximity in a carpeted room, the ultrasonic transmission power may need to be increased to compensate for such attenuation. Additionally, the more power the transmitted sound has, the more likely that the sound will reach a far away object and the echo will travel back at a detectable level. Therefore, increasing the power of the transmission can increase the upper limit of the measurement range of an ultrasonic sensing system.

To increase the transmission power, ultrasonic transmitter 402 can be connected to a booster circuit 422 (hereinafter booster) that is configured to increase the electrical power used for the transmission. In an embodiment, the booster 422 can be implemented by a transformer (e.g., a step-up transformer) configured to increase the voltage level of the electrical signal provided by the controller. Traditional inverter circuit typically can supply only as much as twice the working voltage to drive the ultrasonic transmitter. Such limited power increase in the transmitted ultrasonic waves may be insufficient to account for the attenuating effect caused wave-absorbing material such as sponge, carpet, and the like in the surrounding environment. In contrast, a booster circuit can boost the transmission voltage by much as six times (or even higher, depends on the hardware design) as the operating voltage. With the significantly improved transmitting power, the reflected wave can be more easily received and used to trigger the receiving circuit even with wave-absorbing materials in the surrounding environment.

Preferably, the booster 422 is configured to increase the voltage level of the electrical signal such that the increased voltage level stays within the voltage range associated with the ultrasonic receiver 404. Furthermore, additional mechanisms may be required (e.g., when the driving current from the controller 412 is not sufficient) and implemented as part of the transmitter circuit to increase the output current and to maximize the power of the transmission.

According to another aspect of the present invention, the ultrasonic sensing system 400 provides methods for reducing the impact of blind zone or to realize zero-blind zone (e.g., reducing the size of the blind zone to zero). The methods can be similar to that discussed in connection with FIG. 3. As discussed above, reverberation can cause the generation of reverberation signals that can be mistaken for echo signals during the blind zone time period. The present invention addresses the above problem at the circuit level by electrically coupling the ultrasonic receiver 404 with an attenuator circuit 408 only during the blind zone time period so as to attenuate or remove substantially all of the reverberation signals while allowing most, if not all, of the echo signals to pass through. Because the attenuation of received signals is implemented at the circuit level, the cost increase is minimal compared with the cost mechanical suppression of reverberation discussed above.

In an embodiment, the ultrasonic receiver 404 is connected to a switch 406 which is controllable by a switch control signal 420 provided by the controller 412. The switch control signal 420 can cause the switch 406 to electrically couple the ultrasonic receiver 404 and the attenuator circuit 408 during the blind zone time period so as to attenuate received signals. The switch control signal 420 can also cause the switch 406 to electrically decouple the ultrasonic receiver 404 and the attenuator circuit 408 so that the received signals are not attenuated outside the blind zone time period. In some embodiments, the decision to couple or decouple the attenuator circuit 408 is based on a value of a timer (not shown). For example, the timer can be started when the transmitter circuit stops driving the ultrasonic transmitter to transmit ultrasonic signals. As long as the accumulated timer value does not exceed the blind zone time period, the switch 406 can remain in a state where the attenuator circuit 408 is selected. However, when the timer value reaches or exceeds the blind zone time period, the switch control signal 420 causes the switch 406 to decouple from the attenuator circuit.

In some embodiments, the switch 406 can include a single-pole, double-throw (SPDT) switch or may include an arbitrary number of poles and/or throws. In other embodiment, switch can include a multiplexer (mux) demultiplexer (de-mux). The switch 406 can also include an electronic switch such as a power metal-oxide-semiconductor field-effect transistor (MOSFET), solid state relay, power transistor, insulated gate bipolar transistor (IGBT) or the like.

In various embodiments, the attenuator circuit 408 can include one or more passive components forming voltage divider networks to reduce the power of an electrical signal. For example, the attenuator circuit 408 can include a diode and a capacitor or a resister and a capacitor. The components of the attenuator circuit may be arranged in accordance with any arrangement such as the II-type or the T-type.

In various embodiments, the parameters of the attenuator circuit 408 may be configurable to accommodate different circumstances in order to reduce or eliminate reverberation signals without eliminating echo signals. The parameters may be adjusted based on actual and/or previous measurement of reverberation signals and/or echo signals. For example, based on the amplitude of the actual reverberation signals and/or echo signals (e.g., as measured by an oscilloscope), parameters of passive components of the attenuator circuit may be selected to achieve the desired amount of attenuation such as discussed in connection with FIG. 3. For example, the capacitance of a capacitor or resistance of a resistor can be selected to increase or decrease the overall amount of attenuation such that it is sufficient to bring the amplitude of reverberation signals below the triggering value and/or to close to zero.

In various embodiments, the characteristics (e.g., amplitude) associated with the actually measured reverberation signals and/or echo signals may be determined by a variety of factors such as parameters or properties of the ultrasonic transmitter/receiver, installation position or method of the ultrasonic transmitter/receiver (e.g., distance between the transmitter probe and the receiver probe, whether mechanical vibration reduction such as padding is in place, etc.), propagation medium, objects in the surrounding environment, and the like. For example, installed using similar methods, different ultrasonic probes may produce different reverberation and/or echo signals. Even the same ultrasonic probes may produce different reverberation and/or echo signals when installed differently.

According to another aspect of the present invention, methods and systems are provided for dynamically adjusting gains associated the amplification of the echo signals to improve the accuracy and/or range of proximity measurement. Existing ultrasonic sensors sometimes include fixed-gain amplifiers, wherein the amount of gain is determined by the gain required to reach the maximum measuring distance. Under certain circumstances, such a fixed-gain control approach can lead to inaccurate measurement results. In particular, in a crowded environment, the objects closer than the maximum measuring distance can cause false triggering of the comparator, leading to inaccurate measurement. For example, during a proximity measurement against the ground, if the there is a box on the ground that is within the transmission range of the transmitter probe, then the echo from the box can reach the receiver probe first due to over amplification caused by the fixed gain based on the maximum measuring distance. In contrast, using the adjustable gain control approach as described by the present invention, the gain value is provided based on the measuring distance. Thus, a smaller gain is provided for a shorter measuring distance, thereby avoiding over-amplification of the echo from close-range objects. As such, the measurement accuracy of ultrasonic sensing systems is improved by the present invention.

In an illustrative embodiment, the ultrasonic sensing system 400 includes a gain-adjustable amplifier 410 that is configured to amplify received signals according to an adjustable gain control (AGC) signal 418 provided dynamically by the controller 412. In an embodiment, the gain-adjustable amplifier 410 can be electrically coupled to the ultrasonic receiver 404 via the switch 406. During the blind zone time period, the gain-adjustable amplifier 410 can be connected in series with the attenuator circuit 408 so as to amplify the signals that have been attenuated by the attenuator circuit 408. Such post-attenuation amplification may be necessary to bring the attenuated echo signals above the triggering value in order to trigger proximity measurement processing. Beyond the blind zone time period, the gain-adjustable amplifier 410 can be used to directly amplify received signals bypassing the attenuator circuit 408 (e.g., via the switch 406). Such amplification of echo signals received outside the blind zone time period can be used to compensate for the attenuation caused by the propagation medium (e.g., air, water) increasing the range and accuracy of the proximity measurement.

In some embodiments, the gain provided by the gain-adjustable amplifier 410 is dynamically adjusted based on the measuring distance. Once the ultrasonic signals are transmitted, the measuring distance of the ultrasonic sensing system increases as transmitted signal is propagated further away. The farther the measuring distance, the more attenuated the echo signal is, due to the attenuation caused by the propagation medium. Hence, more gain generally needs to be provided for the received signals to compensate for the increasing attenuation as the measuring distance increases over time. In an embodiment, the gain provided by the gain-adjustable amplifier 410 is dynamically adjusted to gradually increase (according to the AGC signal 418) as the measuring distance increases. The adjusted gain may be the same or more than a previously-provided gain.

In some cases, the exact attenuation characteristics of the ultrasonic signals may vary depending on the propagation media (e.g., air, water), transmission frequency, transmitter/receiver properties, installation methods, and other factors. As such, the AGC signal 418 and hence the gain provided by gain-adjustable amplifier 410 can be provided based at least in part on empirical measurement of the actual gains required to elevate a received echo signal to reach the triggering value or detectable level (e.g., sufficient to trigger an interrupt by a comparator) at varying measuring distances. Alternatively, the gain can be automatically adjusted based on the strength of the received signal. For example, the gain may be proportional to the strength of the receive signal, for example, in a linear or exponential fashion.

Figure 5:
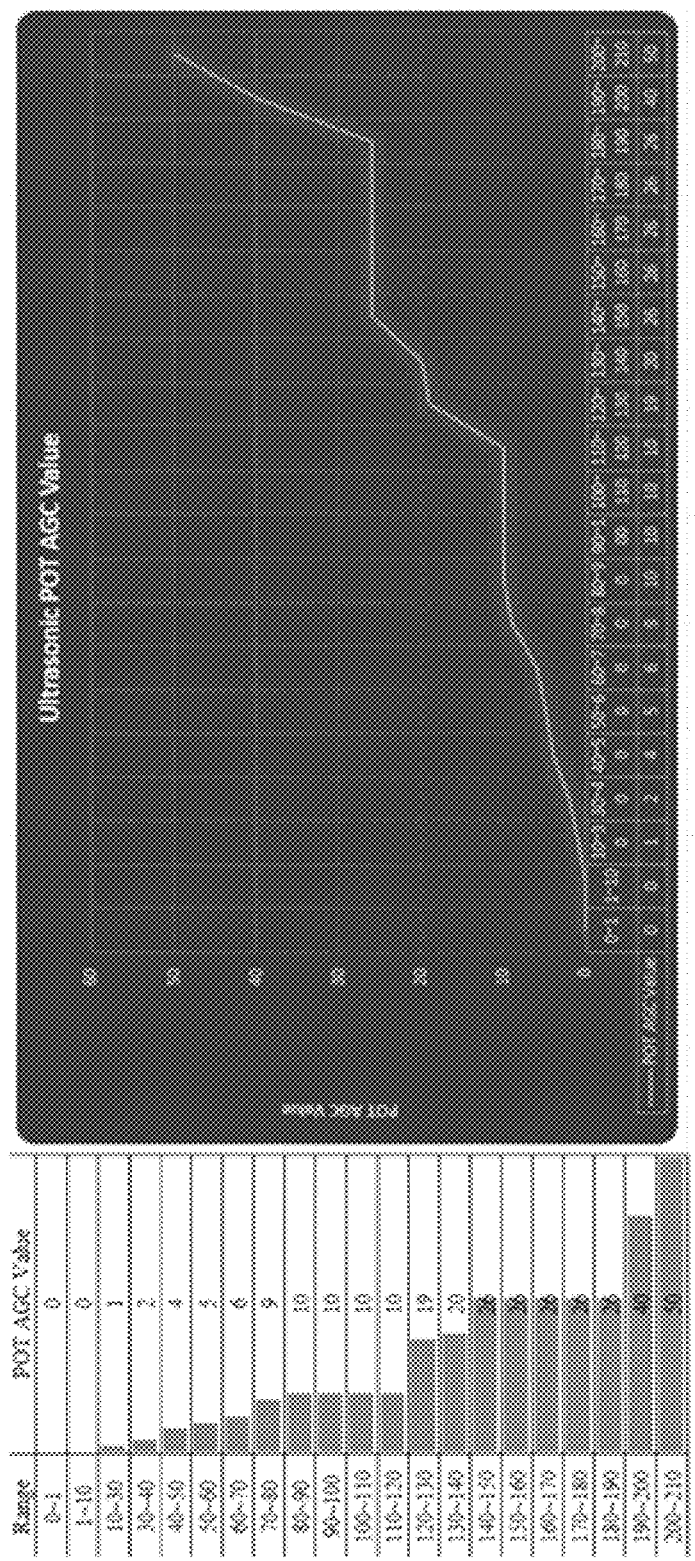
FIG. 5 illustrates some exemplary AGC gain values (AGC values) corresponding to varying measuring distances, in accordance with an embodiment.

FIG. 5 illustrates some exemplary AGC gain values (AGC values) associated with various measuring distances or measuring ranges, in accordance with an embodiment. For a given measuring distance or range, the corresponding AGC gain is required to amplify the echo signals received from that measuring distance or range to a detectable level (e.g., exceeding the triggering value defined by a comparator). The table on the left side of FIG. 5 shows the measuring ranges ("Range") in centimeters (cm) in the left column and the corresponding AGC value ("POT AGC Value") in logarithmic decibel (dB) in the right column. The AGC value can be derived based on an input echo signal and an output signal as amplified by a gain-adjustable amplifier and can indicate the degree the input signal is amplified. In an embodiment, the AGC values may be measured by a potentiometer or other measuring instruments. Thus, the data shown in FIG. 5 illustrates the correlation between AGC value and the measuring distance. The chart on the left side of FIG. 5 illustrates the same data. As shown by the table and the chart of FIG. 5, the AGC value generally increases as the measuring distance increases. In some cases, the AGC value remains the same for two or more consecutive measuring ranges. In addition to the measuring distance, AGC values may also vary based on the properties of the transmitter/receiver probes, installation methods, propagation medium and other factors.

To provide suitable AGC values for a particular ultrasonic sensing system in a particular environment, a test measurement may be performed to measure and/or calculate the AGC values (such as those illustrated in FIG. 5) prior to using the ultrasonic sensing system. During the test measurement, the echo signals for varying measuring distances can be analyzed (e.g., using an oscillator) to determine the amplitude of the echo signals. For example, the measuring distances can be incremented at fixed intervals (e.g., 10 cm). Based on the amplitude of the received echo signals, the AGC value for the amplifier can be adjusted so as to bring the echo signals to above the triggering value (e.g., the threshold value to trigger a comparator). During the actual proximity measurement, the AGC values derived from such test measurements can be used by the controller of the ultrasonic sensing system to provide gain control signals to the gain-adjustable amplifier so as to attain the desired amount of gain. Given that the change in measuring distance is proportional to the time that has elapsed since the start of the propagation due to constant speed of propagation of sound, the measuring distances shown in the table and chart of FIG. 5 can be converted to the amount of time that has elapsed since the start of the transmission of ultrasonic signals. In some embodiments, lookup tables or similar data structures can be created and used for AGC values for particular sensors and/or conditions. Based on such a lookup table, a time-based gain control method can be provided to proximate the distance-based gain control illustrated in FIG. 5.

Figure 6:
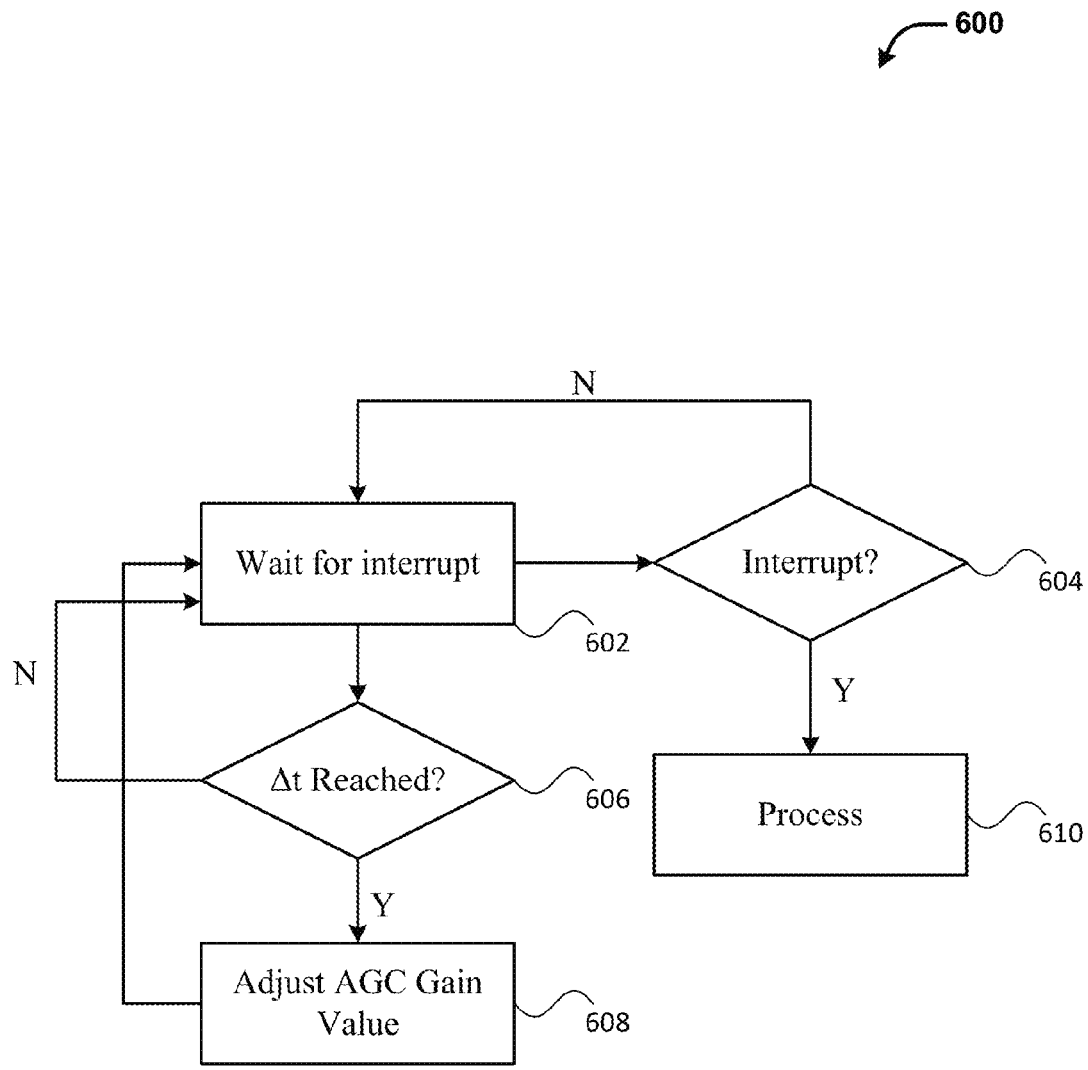
FIG. 6 illustrates an exemplary process for implementing the time-based gain control as described herein, in accordance with an embodiment.

FIG. 6 illustrates an exemplary process 600 for implementing a time-based gain control as described herein, in accordance with an embodiment. In particular, the process 600 can be used to provide dynamically adjusted gain control to a gain-adjustable amplifier to compensate for varying attenuation of input signals. For example, the amount of gain can be adjusted (e.g., incremented or kept the same) as time increases based on the previously measured and/or calculated AGC data. In an embodiment, aspects of the process 600 can be implemented by the controller 412 of FIG. 4.

In an embodiment, the process 600 includes waiting 602 for predetermined interrupts. Such predetermined interrupts can indicate the occurrence of predetermined events that require handling, for example, by an interrupt handler or an Interrupt Service Routine (ISR). For example, such an interrupt may be triggered by a comparator when the input signal is greater than a predetermined triggering value. As another example, an interrupt can be triggered when an output of an analog-to-digital converter (ADC) has reached a predetermined threshold value.

At block 604, it is determined whether an interrupt has occurred. If so, the process 600 includes processing 602 the interrupt, for example, by executing the ISR to calculate the proximity to an object. If not, the process 600 includes returning to the waiting block 602.

In an embodiment, the process 600 includes determining 606 whether a predetermined increment of time $\Delta t$ has elapsed. If so, the AGC gain value is adjusted 608. Otherwise, the process 600 includes returned to the waiting block 602. Thus, the AGC gain value is adjusted at fixed time intervals. The time interval $\Delta t$ can be configurable to any arbitrary time interval. Alternatively, the AGC value can be adjusted at varying time intervals or in response to predetermined events. In some embodiments, adjusting the AGC gain value can include looking up the empirical AGC data such as illustrated in FIG. 5 or variations thereof to determine a suitable AGC value corresponding to the current measuring distance, or equivalently, the current elapsed time. For example, based on the current timer value, it may be determined that the current measuring distance is in the 70-80 cm range (based on the propagation speed of the ultrasonic signal) and the corresponding AGC value is 9 dB according to the table in FIG. 5. Additionally or alternatively, the AGC value can be adjusted based on other factors such as an output from a comparator and/or analog-to-digital converter (ADC), various parameters associated with the ultrasonic sensing system, and the like. Based on some or all of these factors, a suitable control signal may be generated by the AGC value and provided to a gain-adjustable amplifier to attain the desirable gain amount. In some embodiments, process 600 is continued until the time period corresponding to the maximum measuring distance expires. Such maximum measuring distance can configurable.

According to another aspect of the present invention, methods and systems are provided for using the analog-to-digital converter (ADC) in conjunction with a comparator to improve the precision and accuracy of proximity measurement. For example, the ultrasonic sensing system 400 in FIG. 4 includes a comparator 414 and an ADC 416, each connected to the gain-adjustable amplifier 410. The comparator 414 can be configured to compare an input signal from the gain-adjustable amplifier 410 with a predetermined triggering value (e.g., voltage) to provide an indication of whether the input signal is greater than the predetermined triggering value. For example, the comparator 414 may be configured to output a "1" if the input signal is greater than the triggering value and a "0" otherwise. In some embodiments, an output of the comparator (e.g., a "1") can trigger an interrupt such as discussed in FIG. 6, causing the execution of an ISR. The ADC 416 can be configured to convert an analog signal to a digital signal that represents the amplitude (e.g., voltage) of the signal. In some cases, the output of the ADC can be used to trigger an interrupt. For example, such an interrupt can be triggered when the output of the ADC exceeds a predetermined threshold value. In some embodiments, comparator 414 and/or the ADC 416 can be included as a part of or integrated with the controller 412 such as illustrated in FIG. 4. Alternatively, the comparator 414 and/or the ADC 416 can be external to the controller 412.

In some embodiments, the comparator 414 and the ADC 416 can be used in conjunction to improve the accuracy and precision of the measurement of the echo signals. In particular, the comparator 414 can be used to trigger proximity measurement and measurements from the ADC 416 can be used to determine, within a predetermined period of time, a point in time when the relative peak amplitude is received. This point in time can then be used in the calculation of the distance to the object from which the echo signal is received. By pinpointing the time of the peak amplitude, accuracy of the proximity measurement is improved.

Generally, proximity to an object is calculated based on the time interval between the transmission and the receipt of an ultrasonic signal as reflected by the object. The transmission of the ultrasonic signal is typically at the time of transmission of the transmitting wave's peak. If the time of the receipt of the ultrasonic signal is set at the time the comparator is triggered by the reflected wave, the measurement is less than accurate because there is a period of time between when a comparator is triggered by the reflected wave (e.g., below the peak amplitude) and when the peak amplitude is reached. With an ADC, it would be relatively easy to detect peak value of the reflected wave and when the peak value is detected. The time when the peak value is detected can then be used to calculate the distance to the object, thereby improving the accuracy of the measurement.

Figure 7:
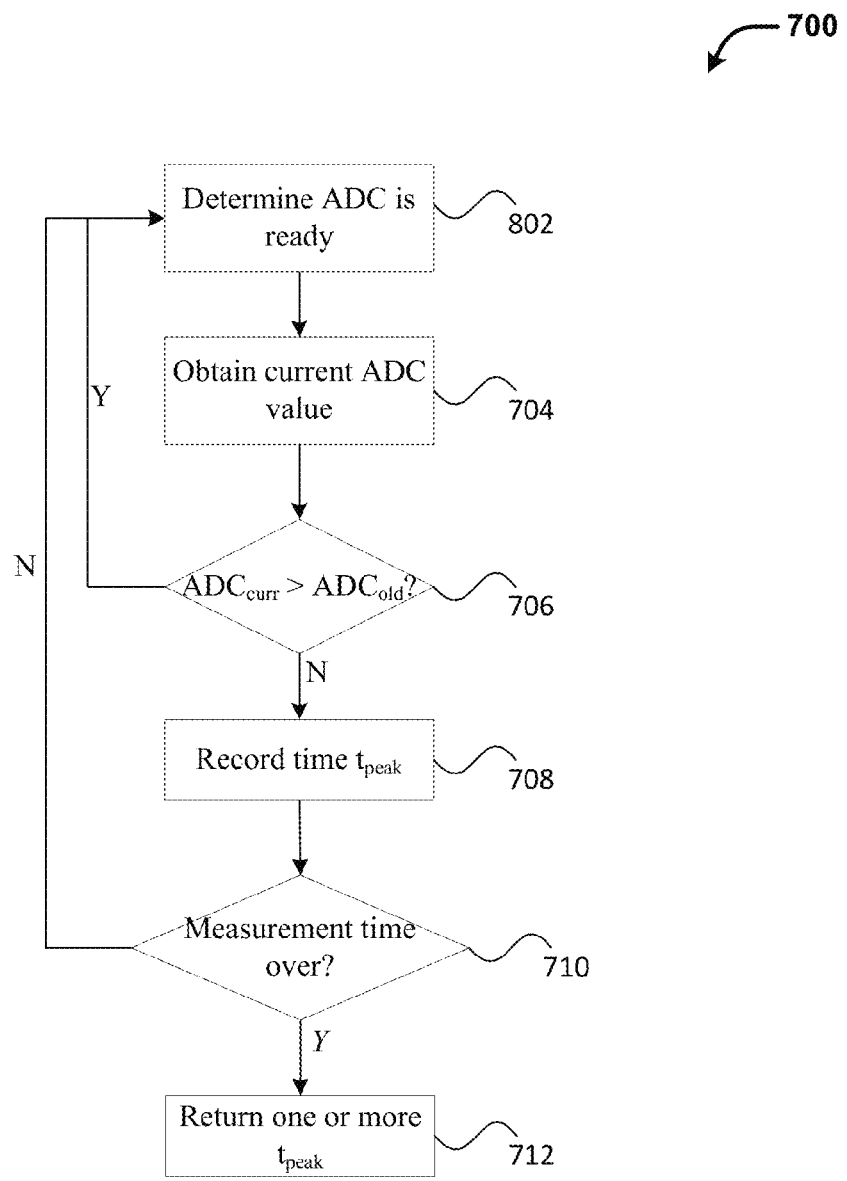
FIG. 7 illustrates an exemplary process for determining the occurrence of peak amplitude, in accordance with an embodiment.

FIG. 7 illustrates an exemplary process 700 for determining the occurrence of peak amplitude, in accordance with an embodiment. The process 700 can be implemented, for example, by software, hardware, or a combination thereof embedded in the controller 412 or elsewhere.

In some embodiments, the process 700 includes determining that the ADC is ready for measurement. In some cases, the ADC is activated for measurement after the comparator is triggered by a received signal. Additionally, an ADC can be configured to take measurement only at certain time intervals. Such time intervals may be configurable by a manufacturer of the ADC, a user of the ADC (e.g., developer, end user, etc.) or the like.

When the ADC is ready for measurement, the current ADC value, $ADC_{curr}$, is obtained 704 using the ADC. The ADC value represents the digitalized amplitude value of the input signal to the ADC. The current ADC value, $ADC_{curr}$, can be compared with a previously obtained ADC value, $ADC_{old}$, to determine 706 whether $ADC_{curr} > ADC_{old}$. In a typical embodiment, $ADC_{old}$ is the ADC value in the immediately preceding measurement. In some embodiments, $ADC_{old}$ is set to 0 at the first ADC measurement and/or after each detection of a peak amplitude (e.g., at or after block 708).

If it is determined that the current ADC value is greater than the previously obtained ADC value, it likely means that the peak amplitude has not arrived yet. Therefore, the process 700 proceeds to block 702 to start the next round of measurement. If, however, the previously obtained ADC value is equal to or greater than the current ADC value, then it means that the peak has been reached. The current timer value $t_{peak}$ is recorded 708. In some embodiments, the timer is started at the transmission of the ultrasonic signal. As such, $t_{peak}$ represents the time interval between the transmission and the receiving of the peak of the ultrasonic signal as reflected by an object.

In some embodiments, the process 700 may be used to detect more than one object within the measurement range of an ultrasonic sensor. As such, there can be more than one $t_{peak}$'s, each associated with a different object. To implement detection of multiple peak amplitude values, the process 700 can include iterating the above process to derive multiple $t_{peak}$'s as long as the measurement time is not over. Before the start of the iteration of measurement, $ADC_{old}$ may be reset to 0. The measurement time typically refers to the time period required to measure a maximum distance from a proximity sensing system implementing the process 700. The measurement time can be determined by the characteristics of the proximity sensing system, the surrounding environment, and/or configurable by a manufacturer, a user, a customer, or the like.

In some embodiments, the process 700 includes determining 710 whether the measurement time is over. If measurement time is over, then the one or more $t_{peak}$ values are returned 712. Otherwise, if the measurement time is not over, the process 700 includes looping back to block 702 to start another iteration of determining when peak amplitude value occurs.

Referring back to FIG. 4, in some embodiments, the comparator 414 and/or ADC 416 can be used to control the gain-adjustable amplifier 410 and/or the switch 406 discussed above. For example, the AGC signal 418 and/or the switch control signal 420 may be generated based on an output from the comparator 414 and/or ADC 416.

In some embodiments, the controller 412 can include a microcontroller unit (MCU) on a single integrated circuit board. In some other embodiments, the controller 412 can include a distributed computing system. The controller 412 can include a processing unit 424, a memory 426 and input/output peripherals (not shown). The processing unit 424 can include one or more processors, such as a programmable processor (e.g., a central processing unit (CPU)). The processing unit 424 can be operatively coupled to the memory 426. The memory 426 can include one or more units of transitory and/or non-transitory storage media configured to store data, and/or logic, code, and/or program instructions executable by the processing unit 424 for performing one or more routines or functions. For example, the memory units may include random access memory (RAM), read-only memory (ROM), erasable programmable read-only memory (PROM), electrically erasable programmable read-only memory (EEPROM), and the like. The memory units of memory 426 can store data such as the AGC value data or variations thereof discussed in FIG. 5, input/output data including such as data from the comparator, ADC, timer, sensor, or the like, processing results from the processing unit 424, and the like. In addition, the memory units of the memory 426 can store operating parameters and/or logic, code and/or program instructions executable by the processing unit 424 to perform any suitable embodiment of the methods described herein. For example, the processing unit 424 can be configured to execute instructions causing one or more processors of the processing unit 424 to provide switch control signal 420 to the switch 406 in order to implement the time-based attenuation as discussed in FIG. 3. In addition, the processing unit 424 can be configured to execute instructions causing one or more processors of the processing unit 424 to provide AGC control signal to the gain-adjustable amplifier 410 so as to implement the distance-based amplification of received signals such as discussed in connection with FIG. 6. Furthermore, the processing unit 424 can be configured to execute instructions causing one or more processors of the processing unit 424 to determine the occurrence (including the timing) of peak amplitude based on the input from the comparator and the ADC such as discussed above. Although FIG. 4 depicts a single processing unit 424 and a single memory 426, one of skill in the art would appreciate that this is not intended to be limiting, and that the system 400 can include a plurality of processing units and/or memory units of the memory.

In some embodiments, the controller 412 can also include a plurality of input/output peripherals (now shown). For example, the controller 412 can include one or more discrete input/out bits, allowing control and/or detection of the logic state of an individual package pin. Alternatively or additionally, the controller 412 can include one or more serial input/output such as serial ports (e.g., universal asynchronous receiver/transmitters (UARTs)). The controller 412 can also include one or more serial communication interfaces such as Inter-Integrated Circuit (I²C), Serial Peripheral Interface (SPI) bus, Controller Area Network (CAN) bus, or the like, for system interconnect. In some cases, the controller 412 can also include one or more peripherals such as timers, event counters, pulse-width modulation (PWM) generators, clock generator (e.g., an oscillator for quartz timing crystal, resonator or RC circuit), and the like. In some cases, the controller 412 can also include one or more digital-to-analog converters, in-circuit programming and/or debugging support, USB and Ethernet support, and the like.

While the methods and systems of the present invention are described in the context of ultrasonic sensing systems, it is appreciated that aspects of the methods and systems of the present invention can also be applicable to a wide variety of proximity sensing systems using radar, sonar, lidar, or other sensing technologies.

In some embodiments, the methods and systems described herein can be used by a movable object to provide information with respect the movable object and/or the surrounding environment such as proximity to target objects (e.g., potential obstacles), location of geographical features, location of manmade structures, and the like. Such information may be used by the movable object to sense spatial disposition, velocity, and/or acceleration of the movable object (e.g., with respect to up to three degrees of translation and up to three degrees of rotation). Additionally, the information can aid the operations of the movable object including but not limited to path planning, autonomous navigation of the movable object along a predetermined flight path, obstacle avoidance, and the like.

The movable object (e.g., a UAV) may include one or more sensors that may sense the spatial disposition, velocity, and/or acceleration of the movable object (e.g., with respect to up to three degrees of translation and up to three degrees of rotation). The one or more sensors can include global positioning system (GPS) sensors, motion sensors, inertial sensors, proximity sensors (e.g., ultrasonic sensor and/or lidar sensor), image sensors, and the like. In some embodiments, the prox-imity sensor can be rotated (e.g., rotated 360°) to obtain distance and position information for a plurality of objects surrounding the movable object. The distance and position information for the surrounding objects can be analyzed to determine the spatial disposition and/or motion of the movable object and/or aid in the navigation of the movable object.

The movable object may also include a controller for controlling the operations of the movable object and/or the components thereof. The movable object can also be controlled remotely by a user or controlled locally by an occupant within or on the movable object. In some embodiments, the movable object is an unmanned movable object, such as an unmanned aerial vehicle (UAV). An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

In some embodiments, aspects of the methods and systems described herein can be implemented by the movable object, a remote control device, or a combination thereof. For example, the controller 412 of the proximity sensing system 400 can be implemented by the controller onboard the movable object that is also capable of controlling the operations of the movable object or a controller off board the movable object such as in a remote control device or base station terminal. For example, the control signals for the switch and/or the gain-adjustable amplifier in FIG. 4 can be provided by the controller of the movable object and/or the remote control device. As another example, the proximity measurement and calculation can be performed by the controller of the movable object, a remote control device, a base station or some third-party device. In various embodiments, the controller of the proximity sensing system may be separate from or integrated with the controller of the movable object. In some embodiments, the same remote control device may be operable to control the movable object and the proximity sensing system. In other embodiments, separate remote control devices may be used to control the movable object and the proximity sensing system. In some embodiments, data provided by the proximity sensing systems described herein may be used alone or in conjunction with data from other sensors or sensing systems onboard and/or off board the movable object such as GPS sensors, motion sensors, inertial sensors, proximity sensors, image sensors, and the like, to provide positional, attitude and/or other state information about the movable object and/or the environment surrounding the movable object.

In various embodiments, the movable object can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a space plane, a satellite, or a probe), or any combination of these environments. The movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof.

In some instances, the movable object can be a manned or unmanned vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

For example, the propulsion system can include one or more rotors. A rotor can include one or more blades (e.g., one, two, three, four, or more blades) affixed to a central shaft. The blades can be disposed symmetrically or asymmetrically about the central shaft. The blades can be turned by rotation of the central shaft, which can be driven by a suitable motor or engine. The blades can be configured to spin in a clockwise rotation and/or a counterclockwise rotation. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. One or more rotors may be used to provide a torque counteracting a torque produced by the spinning of another rotor.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An ultrasonic sensing system, comprising:
   an ultrasonic transmitter configured to provide a transmission of ultrasonic signals;
   an ultrasonic receiver configured to receive ultrasonic signals generated as a result of the transmission including reverberation signals and echo signals;
   an attenuator circuit connectable to the ultrasonic receiver via a switch, the attenuator circuit operable for attenuating the received ultrasonic signals; and
   a microcontroller unit (MCU) configured to control the switch to electrically couple the ultrasonic receiver with the attenuator circuit during a predetermined period of time after the transmission of ultrasonic signals and electrically decouple the ultrasonic receiver from the attenuator circuit prior to and after the predetermined period of time.

2. The system of claim 1, wherein the ultrasonic transmitter is the ultrasonic receiver.

3. The system of claim 1, wherein the predetermined period of time corresponds to a blind zone time period for the ultrasonic sensing system.

4. The system of claim 1, wherein the attenuator circuit is configured to provide an amount of attenuation selected based at least in part on a previously-measured amplitude of a reverberation signal or an echo signal.

5. The system of claim 1, further comprising a booster coupled to the ultrasonic transmitter and configured to increase an energy level associated with the transmission of ultrasonic signals.

6. The system of claim 1, further comprising a gain-adjustable amplifier coupled to the ultrasonic receiver and configured to amplify the echo signals.

7. The system of claim 6, wherein the MCU is further configured to control the gain-adjustable amplifier to vary its gain based at least in part on a value of a timer that corresponds to a measuring distance.

8. The system of claim 7, wherein the MCU is further configured to control the gain-adjustable amplifier to vary its gain based at least in part on previously-measured data.

9. The system of claim 6, wherein the MCU is further configured to control the switch to electrically couple the ultrasonic receiver with the gain-adjustable amplifier without electrically coupling the attenuator circuit with the gain-adjustable amplifier after the predetermined period of time has elapsed.

10. The system of claim 6, further comprising a comparator connected to the gain-adjustable amplifier that is configured to compare an output of the gain-adjustable amplifier with a predetermined threshold value.

11. The system of claim 10, wherein the comparator is integrated with the MCU.

12. The system of claim 10, further comprising an analog-to-digital converter (ADC) connected to the gain-adjustable amplifier that is configured to convert the output of the gain-adjustable amplifier to a digital value.

13. The system of claim 12, wherein the comparator and the ADC are used in conjunction to determine an occurrence of a peak amplitude of a received ultrasonic signal.

14. A method for ultrasonic sensing, comprising:
   detecting, with aid of an ultrasonic receiver, a signal after termination of a transmission of ultrasonic signals, wherein the detected signal is an echo signal or a reverberation signal;
   determining whether the detection of the ultrasonic signal occurs within a predetermined period of time from the termination of the transmission of ultrasonic signals;
   in response to a determination that the detection of the signal occurs within the predetermined period of time, attenuating, with aid of an attenuator circuit, the detected signal to sufficiently reduce interference caused by reverberation from the transmission of the ultrasonic signals;
   electrically decoupling the ultrasonic receiver from the attenuator circuit when the predetermined period of time has elapsed; and
   in response to a determination that the detection of the signal occurs after the predetermined period of time has elapsed, processing, without attenuating, the detected signal to determine proximity of an object.

15. The method of claim 14, wherein the predetermined period of time corresponds to a blind zone time period.

16. The method of claim 14, wherein attenuating the detected ultrasonic signal is based at least in part on one or more previously-measured signals.

17. The method of claim 14, wherein processing the detected ultrasonic signal includes determining occurrence of a peak amplitude using a comparator and an analog-to-digital converter (ADC).

18. The method of claim 14, further comprising providing a gain to the detected ultrasonic signal based at least in part on previously-measured data that correlates a measuring distance and a gain suitable for the measuring distance.

19. The method of claim 14, further comprising providing a gain to the detected ultrasonic signal based at least in part on a timer value.

20. An ultrasonic sensing system, comprising:
   an ultrasonic transmitter configured to provide a transmission of ultrasonic signals;
   an ultrasonic receiver configured to receive ultrasonic signals generated as a result of the transmission including reverberation signals and echo signals;
   an attenuator circuit connectable to the ultrasonic receiver via a switch, the attenuator circuit operable for attenuating the received ultrasonic signals; and
   a microcontroller unit (MCU) configured to control the switch to electrically couple the ultrasonic receiver with the attenuator circuit only during a predetermined period of time after the transmission of ultrasonic signals;
   a comparator connected to a gain-adjustable amplifier connected to the ultrasonic receiver; and
   an analog-to-digital converter (ADC) connected to the gain-adjustable amplifier,
   wherein the comparator and the ADC are configured to be used in conjunction to determine an occurrence of a peak amplitude of a received ultrasonic signal.

21. The system of claim 20, wherein the ultrasonic transmitter is the ultrasonic receiver.

22. The system of claim 20, wherein the predetermined period of time corresponds to a blind zone time period for the ultrasonic sensing system.

23. The system of claim 20, wherein the attenuator circuit is configured to provide an amount of attenuation selected based at least in part on a previously-measured amplitude of a reverberation signal or an echo signal.

24. A method for ultrasonic sensing, comprising:
   detecting a signal after termination of a transmission of ultrasonic signals, the detected signal can be an echo signal or a reverberation signal;
   determining whether the detection of the ultrasonic signal occurs within a predetermined period of time from the terminal of the transmission of ultrasonic signals;
   in response to a determination that the detection of the signal occurs within the predetermined period of time, attenuating the detected signal to sufficiently reduce interference caused by reverberation from the transmission of the ultrasonic signals; and in response to a determination that the detection of the signal occurs after the predetermined period of time has elapsed, processing, without attenuating, the detected signal to determine proximity of an object, wherein processing the detected ultrasonic signal includes determining occurrence of a peak amplitude using a comparator and an analog-to-digital converter (ADC).

25. The method of claim 24, wherein attenuating the detected ultrasonic signal is based at least in part on one or more previously-measured signals.

* * * * *